United States Patent [19]

Pickrell

[11] 4,113,120
[45] Sep. 12, 1978

[54] CONTAINER HANDLING AND TRANSPORTING APPARATUS

[76] Inventor: John W. Pickrell, 4206 N. 68th St., Scottsdale, Ariz. 85251

[21] Appl. No.: 770,398

[22] Filed: Feb. 22, 1977

[51] Int. Cl.² .............................................. B65F 3/02
[52] U.S. Cl. ................................ 214/38 D; 214/302; 214/505; 214/518; 214/83.3
[58] Field of Search .............................. 214/302–303, 214/313, 518, 90 R–91, 147 G, 83.3, 82, 505, 38 R, 38 D

[56] References Cited

U.S. PATENT DOCUMENTS

| | | | |
|---|---|---|---|
| 2,543,295 | 2/1951 | McGregor et al. | 214/38 D |
| 2,984,374 | 5/1961 | Herpich et al. | 214/302 |
| 3,202,305 | 8/1965 | Dempster et al. | 214/302 |
| 3,207,345 | 9/1965 | Ord | 214/302 |
| 3,325,024 | 6/1967 | Shubin | 214/302 |
| 3,380,600 | 4/1968 | Klanner et al. | 214/38 D |
| 3,580,403 | 5/1971 | Lancashire | 214/38 D |
| 3,765,554 | 10/1973 | Morrison | 214/147 G X |
| 4,057,157 | 11/1977 | Park et al. | 214/302 |

Primary Examiner—Drayton E. Hoffman
Assistant Examiner—R. B. Johnson
Attorney, Agent, or Firm—John A. Robertson; Don J. Flickinger

[57] ABSTRACT

A trash container with a bustle and a bustle actuator is removeably carried on a vehicle with a tiltable chassis. The container has a generally box like configuration and a moveably trash compacting side pivotally connected to the container. The vehicle chassis has a pivotally mounted compactor arm adapted to cooperate with the pivotally moveable compacting side of the trash container such that the compactor arm alternately opens and closes the moveable side of the container for compacting trash therein. A ledge structure on the vehicle chassis supports the pivotal axis of the moveable side of the container in co-axial alignment with the pivotal axis of the compactor arm. The container is moved on and off of the chassis by tilting the chassis and connecting the compactor arm to the container by a chain. A crusher is pivotally mounted on the trash container to force trash downwardly into the container. Inclined racks are provided for supporting the containers when they are not on a vehicle. A haul truck with a tiltable container support portion is adapted to carry a plurality of the containers.

17 Claims, 32 Drawing Figures

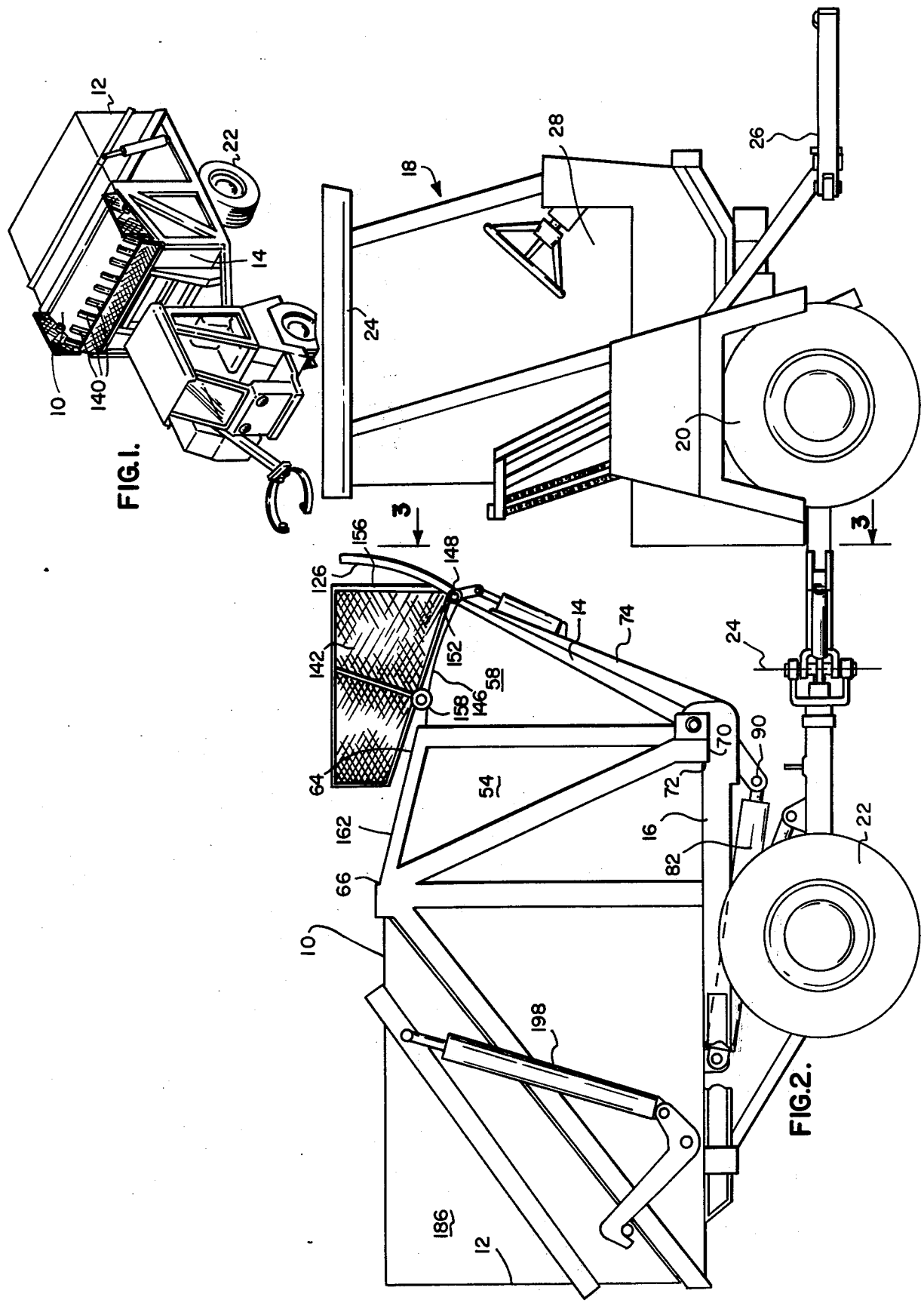

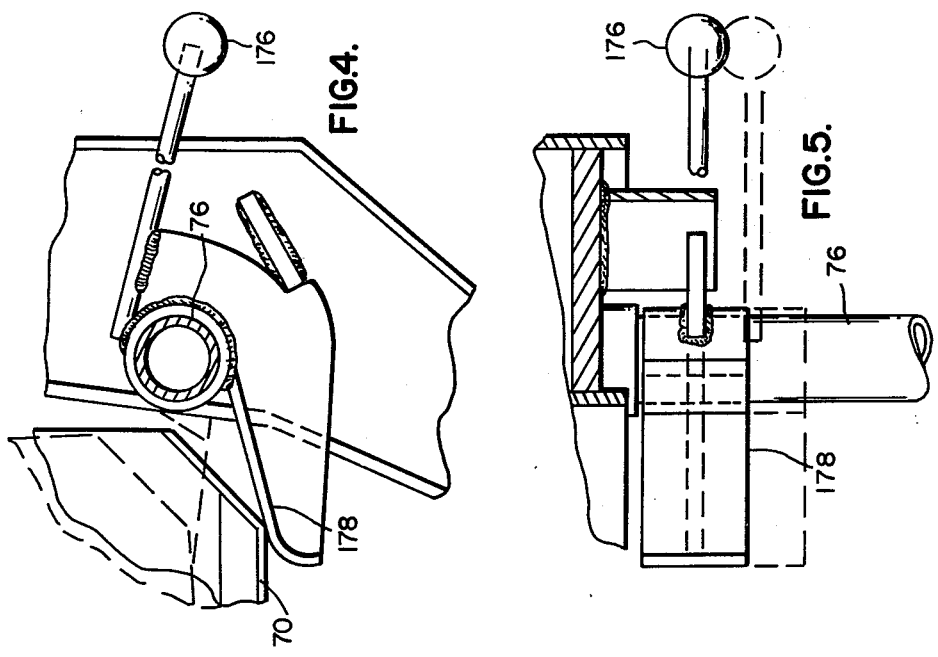
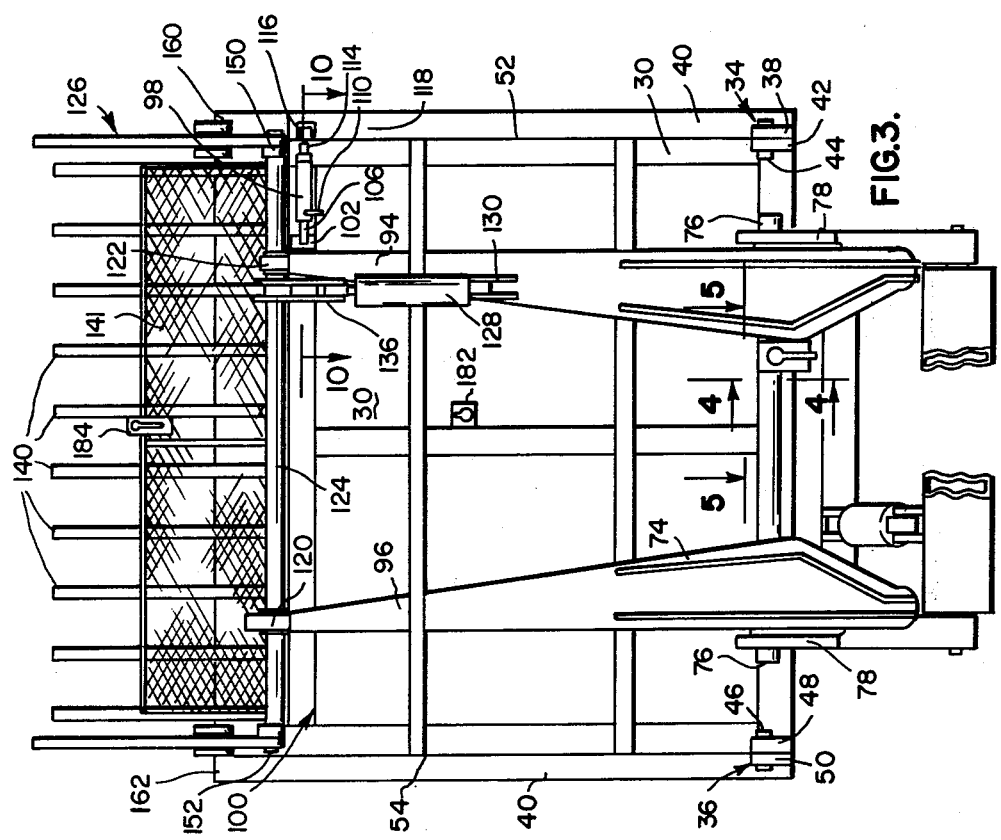

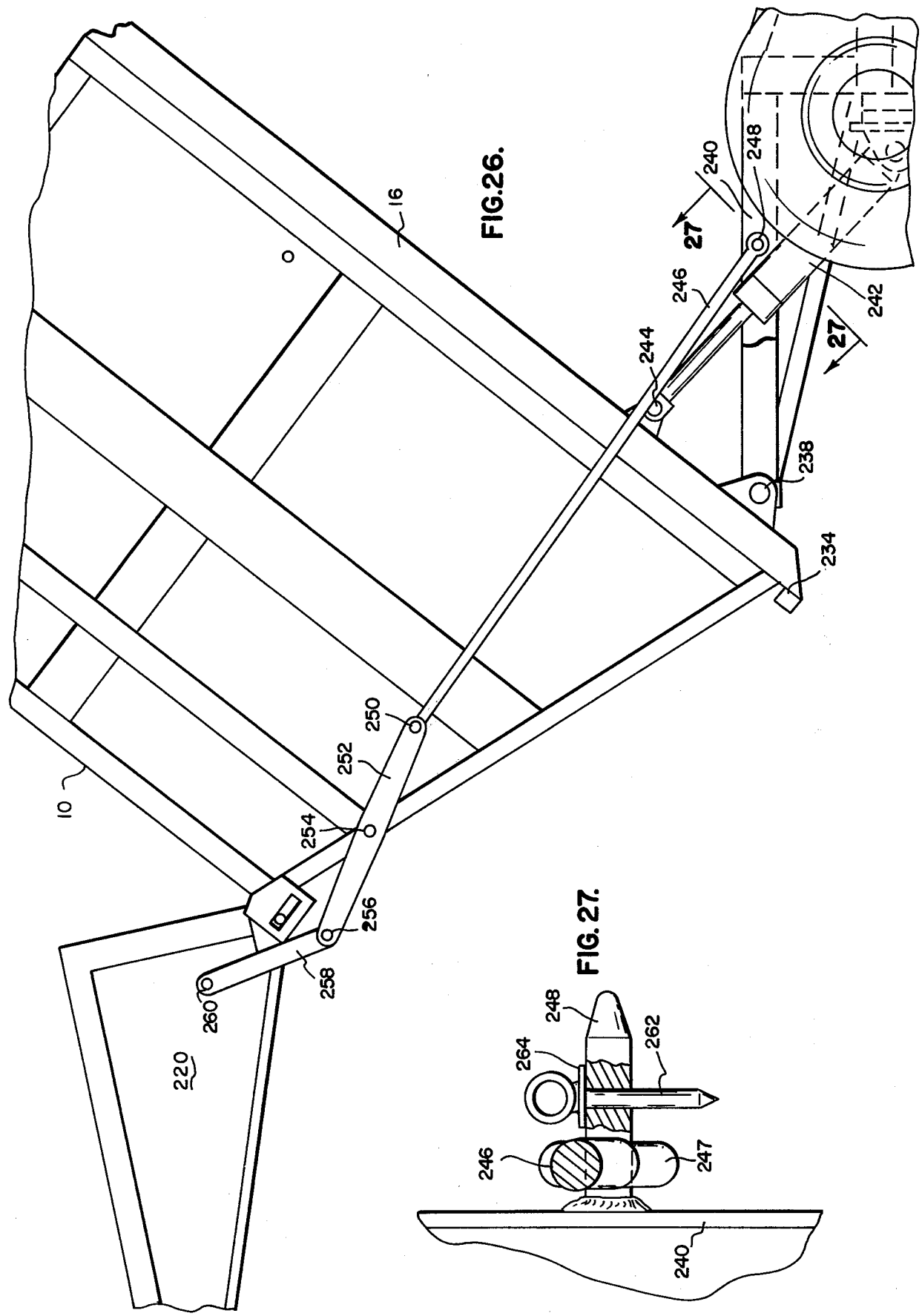

CONTAINER HANDLING AND TRANSPORTING APPARATUS

BACKGROUND OF THE INVENTION

In municipal areas, the collection of trash by large vehicles has generally posed a problem in that the trash collecting vehicle must leave the particular municipal area each time the trash collecting bin thereof is full. The conventional large trash collecting vehicles also require considerable labor in that the vehicle requires a driver and usually two additional workers for the loading of trash from the usual domestic trash receptacles into the receiving area of the large trash collection vehicle bin. In many municipal areas, there is not sufficient room in alleys and other narrow driveways for the storage of trash collecting bins and therefore, in such areas, the small household trash or conventional garbage cans are used due to limited space, and in such areas the usual front loader vehicle which picks up large containers is not operable due to the limited space as aforementioned.

SUMMARY OF THE INVENTION

The invention relates to a trash container and compactor for trash collecting vehicles and more particularly to compact trash collecting vehicles which are capable of operating rapidly and efficiently in confined space, such as narrow alley ways, where trash must be collected from the usual and conventional domestic garbage can or trash container; the trash container of the invention being removeably carried on a small highly maneuverable vehicle chasis and the container having one pivotally moveable side serving as a compactor side and this compactor side is pivotally mounted on a generally horizontal axis near the forward lower portion of the container which faces a forward portion of the vehicle and which is thus adapted to be opened in a forward direction and to receive trash from a front loader capable of handling small domestic garbage cans or trash containers. The compactor side of the aforementioned container, at its pivotal axis, is held on the chasis temporarily in alignment with the pivotal axis of a compactor actuator which is power operated on the vehicle chasis. The alignment of the axis of the compactor actuator and the moveable compactor side of the container allows the compactor side of the container to move forward at its upper edge away from the container to receive trash and then backwards toward the container for compacting the trash. The compactor actuator is also provided with pivotally mounted crusher means which substantially coincides, at its pivotal axis, with the upper edge of the compactor side of the container such as to compact trash downwardly before the compactor actuator moves the compactor wall of the container backwardly for compressing trash therein. Connected to the compactor side of the container, are a pair of quadrants which slide inward and outward relative to opposite sides of the container so as to enclose the triangular spaces at opposite generally vertical edges of the compactor side of the container as it moves forward. Additionally, the aforementioned crusher is foraminous and coupled thereto are a pair of moveable side screens adapted to trasverse forward and backwardly relative to the upper portion of the trash container, as the compactor side of the container is moveable; the aforementioned screens being upstanding generally above the container and provide a shield which prevents wind from scattering trash while it is being dumped into the trash container preliminary to the operation of the aforementioned crusher, which forces the trash downwardly to a position behind the compactor wall of the container, whereupon it may be moved backward into a compacting position by means of the aforementioned compactor actuator.

The vehicle chasis on which the trash container of the invention is removeably mounted is provided with an articulated steering chasis having a vertical steering axis which is disposed generally below and generally in alignment with an area near the front side of the container when on the vehicle chasis such that a front loader on the vehicle accurately dumps trash from domestic receptacles generally over the pivotal steering axis of the vehicle and thus always coinciding with the open compactor side of the container, even though the vehicle may be in various pivoted positions such as steering sharply to the right or to the left.

When a trash container of the invention is full and the trash is compacted therein, the container may readily be removed from the chasis and placed on a storage rack for larger vehicles to transport to the dump. This is accomplished by very simple disconnection of the compactor actuator from the moveable side of the container and also displacement of the simple holding means of the chasis, which holds the container in place; this being a recessed ledge structure adapted to resist the compaction force of the compactor actuator as it moves the moveable side of the container backward during compaction of trash in the container.

The container is also provided with an openable bustle at the rearward portion thereof such that the trash from the container may be dumped by pivoting the pivotal frame of the chasis upward into a rearward declining position during which time the bustle is opened allowing the trash to be dumped from a container. In this manner, the trash container and compactor for trash collecting vehicles may be used in a municipal area with a storage yard for receiving the trash from the container each time the bustle is opened and the trash is dumped in the storage yard where it may later be handled by large vehicles or this facility of the bustle in connection with the container may be used at a conventional city dump which is adjacent to a municipal area.

Novel means of the invention is provided for actuating the aforementioned bustle either by hydraulic cylinder operated mechanism or by conventional mechanical linkage which is coupled to the basic vehicle frame such that the linkage is capable of motivating actuation of the bustle as the tiltable portion of the vehicle chasis is tilted upwardly at its forward portion into a rearwardly declining position.

The invention also comprises novel means for loading and unloading the trash container of the invention relative to a tiltable portion of the vehicle chasis and this means includes the use of the compactor actuator which compacts trash in the container for initially pulling the trash container onto the tilted vehicle chasis into a position thereon such that a pivoted compactor wall of the trash container is in alignment with the pivotal axis of the compactor actuator whereupon the compactor actuator may be latched to the moveable side of the container and may be ready for operation. The means for loading the container on the tiltable vehicle chasis comprises a chain and this chain is initially used to pull the trash container from the ground up onto the inclined portion of the vehicle chasis and furthermore, the compactor actuator is provided with a pivoted crusher which is pivoted to the upper portion thereof, and the chain may be operated by the pivoted crusher which is power operated by hydraulic cylinder means or the like.

Accordingly, it is an object of the present invention to provide a trash container and compactor for trash collecting vehicles which is temporarily carried on a chasis of a vehicle during which time a pivoted side of the container is power operated by a compactor actuator on the chasis of the vehicle for compacting trash therein; the pivoted side of the container having a pivotal axis coinciding with that of the compactor actuator.

Another object of the invention is to provide a novel trash container and compactor which is removeably mountable on a vehicle and which employs a pivoted side at the forward portion of the container as a compactor and which also has an unloading bustle pivoted to the rearward portion of the container for opening the container at the rearward portion and dumping trash therefrom after trash has been received by the container and compacted therein with the forward and rearward pivotal movements of the compactor wall or side of the container.

Another object of the invention is to provide a novel trash collecting system using a small highly maneuverable vehicle which handles usual domestic garbage cans or trash containers and which is able to handle such containers in small narrow alleyways or the like and which economically loads the trash into trash containers and compacts the trash therein such that the containers may readily be removed from the vehicle and later transported in mass or in plurality by larger handling vehicles.

Another object of the invention is to provide a novel articulated steering vehicle chasis and trash container and compactor in which the container and compactor is removeable from the chasis and when disposed on the chasis is such that the trash receiving area of the container is over the vertical pivotal axis of the articulated steering mechanism of the vehicle such that a front loader mounted on the vehicle will deliver trash over the pivotal axis and at all times direct the dumping of trash into the container due to the fact that its receiving area is always generally over said pivotal axis. Thus, regardless of the steering attitude of the vehicle's chasis, the front loader thereof will always dump trash containers directly into the trash container and compactor carried on the vehicle chasis.

Another object of the invention is to provide a trash container and compactor for trash collecting vehicles having a trash container provided with novel bustle means for opening the container at the rearward portion thereof and novel means for actuating the bustle, either hydraulically or by means of power actuated mechanism or by means of linkage operable relative to the tilting of a portion of the chasis relative to the basic frame of the chasis, such that when the container carried on the tiltable portion is tilted up to an incline, the linkage automatically is actuated to open the aforementioned bustle.

Further objects and advantages of the invention may be apparent from the following specification, claims and accompanying drawings.

BRIEF DESCRIPTION OF THE DRAWINGS

FIG. 1 is a perspective view of a trash collecting vehicle showing the trash container and compactor of the invention thereon;

FIG. 2 is an enlarged side elevational view of the vehicle chasis and trash container as illustrated in FIG. 1;

FIG. 3 is an enlarged view taken from the line 3—3 FIG. FIG. 2;

FIG. 4 is an enlarged fragmentary sectional view taken from the line 4—4 of FIG. 3;

FIG. 5 is an enlarged fragmentary sectional view taken from the line 5—5 of FIG. 3;

FIG. 19 is a side elevational view of the vehicle and the trash container being unloaded therefrom onto storage racks from which the containers are loaded in plurality onto large trucks for transportation from a domestic or municipal area into the area of the city dump or the like;

FIG. 26 is an enlarged fragmentary sectional view showing a mechanical actuating linkage for operating the bustle of the container of the invention relative to pivotal movement of a tiltable portion of the vehicle chasis which carries the container;

FIG. 27 is an enlarged fragmentary sectional view taken from the line 27—27 of FIG. 26;

DESCRIPTION OF THE PREFERRED EMBODIMENTS

Figure 6:
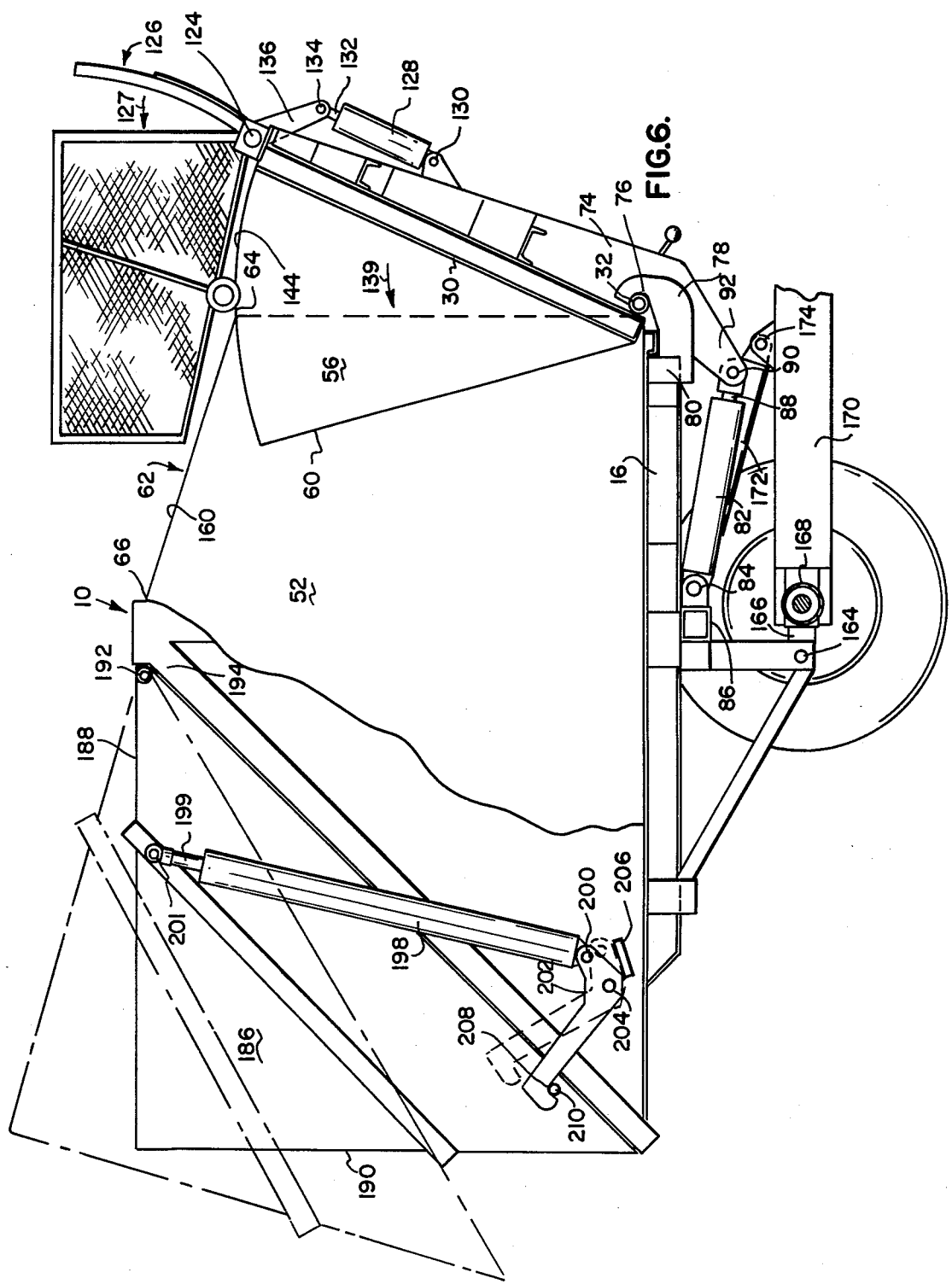
FIG. 6 is an enlarged fragmentary sectional view taken in the same direction as that shown in FIG. 2 and illustrating various operating positions of the compactor side of the trash container and details of the compactor actuator of the invention.

As shown in FIG. 1 of the drawings, a trash container 10 is a generally box shaped structure having a rearward end 12 and a forward end 14; the trash container 10 being carried on the chasis 16 of a vehicle 18 having front wheels 20 and rear wheels 22. The vehicle 18 is provided with articulated steering between the front and rear wheels and is steerable about a vertical axis 24 which tends to intersect the forward portion 14 of the container 10 such that a front loader mechanism 26 adjacent the driver's compartment 28 of the vehicle may consistently move into a position above the axis 24 or in alignment therewith so as to dump trash containers into the forward portion 14 of the container 10 regardless of the steering attitude of the front and rear wheels about the axis 24, which is the steering axis of the vehicle 18.

Figure 17:
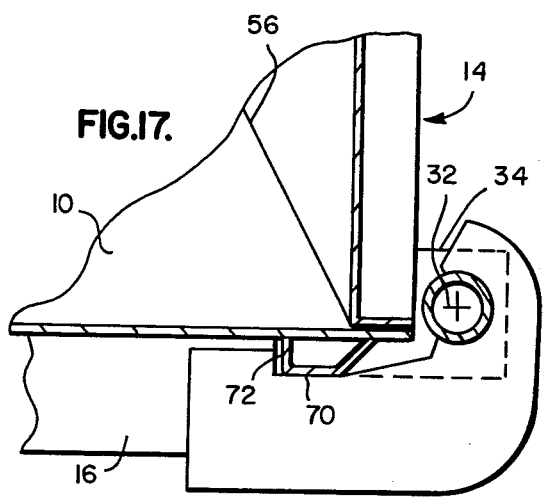
FIG. 17 is a fragmentary sectional view showing the ledge locking of the container on the vehicle chasis and also the relative disposition of the pivotal axis of the compactor side of the container in alignment with the compactor actuator pivotal axis.
Figure 16:
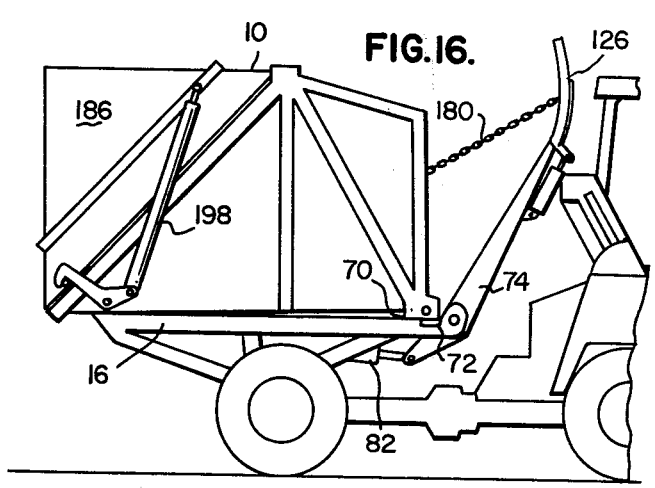
FIG. 16 is a side elevational view showing the completion of the loading of the container on the vehicle chasis and wherein the container is being pulled into position wherein the compactor side of the container at its pivotal axis is aligned with the pivotal axis of the compactor actuator.

As shown in FIGS. 3, 6 and 17 of the drawings, the forward portion 4 of the container 10 comprises a compactor side 30 which is pivotally mounted to a lower forward portion of the container about an axis 32 which is provided by projecting bearing carriers 34 and 36; the bearing carrier 34 is provided with a projecting portion 38 and the portion 38 is fixed to the framework 40 of the container and the bearing carrier 34 is also provided with another projecting bearing carrier 42 which is fixed to the lower forward side of the compactor 30 and a pivot pin 44 projects through the bearing carriers 38 and 42 and the pin 44 is axially aligned with another pin 46 which passes through bearing carriers 48 and 50 similar to the bearing carriers 42 and 38 respectively, and thus the bearing carrier 36 comprises the projecting carriers 48 and 50 through which the bearing pin extends; the projecting carrier 50 being secured to the frame 40 of the container 10, while the projecting carrier 48 being fixed to the compactor side 30 of the container 10.

As shown in FIG. 17, it will be seen that the projecting bearing carriers 34 and 36, shown in FIG. 3, project forwardly toward the forward portion 14 of the container 10.

It will be seen that the compactor side 30 of the container 10 is provided with opposite side portions 52 and 54 which are vertically disposed and coupled to these portions 52 and 54 are quadrant portions 56 and 58 respectively which enclose a space therebetween when the compactor side 30 of the container is moved forward to a position such as shown in FIG. 6 of the drawings; it being noted that a rear edge 60 of the quadrant portion 56 overlaps the respective side 52 of the container 10, while the quadrant 58 shown in FIG. 2 for example overlaps the respective side 54 of the container 10.

As shown in FIGS. 2 and 6 of the drawings, the container is provided with an open area 62 between said sides 52 and 54. This open area extends from a forward upper portion 64 of the container 10 to a portion 66 rearwardly thereof as shown best in FIGS. 2 and 6 of the drawings. Thus, when the compactor side of the container 10 is pivoted forwardly into the relatively open position as shown in FIG. 6, trash may be deposited between the compactor side 30 and the extremity of the open area as indicated at 66 in FIG. 6 of the drawings. The opposite sides 52 and 54 of the container, together with the quadrant portions 56 and 58, connected to the compactor side 30 of the container, provides an enclosure or generally vertical wall structure between which the trash may be deposited in the forward portion of the container 10.

As shown in FIG. 2 and FIG. 17, the forward lower portion of the container 10 is provided with a ledge structure 70 which engages a recessed ledge structure 72 in the tiltable vehicle frame structure 16. The ledge structure 70 and 72 maintain the axes of the bearing pins 44 and 46 aligned with the axis 32 which is also the pivotal axis of a compactor actuator 74; this compactor actuator 74 being mounted on a shaft 76 which is carried by a forwardly extending bracket 78 fixed to a forward end portion 80 of the vehicle frame structure 16. A hydraulic cylinder 82 is power actuated to pivot the compactor actuator 74 about the axis 32 of the shaft 76. The hydraulic cylinder 82 is stationarily and pivotally mounted on a pin 84 in connection with a base frame structure 86 of the vehicle 18 and the plunger 88 of the hydraulic cylinder 82 is pivotally mounted on a pivot pin 90 which is connected with the lower portion 92 of the compactor actuator 74 below the axis 32 of the shaft 16.

It will be therefore understood that the forward portion of the container 10 comprises the pivoted compactor wall 30 which is pivotally mounted about the bearing pins 44 and 46 which are axially aligned with the axis 32 of the shaft 76 about which the compactor actuator 74 is pivotally mounted.

Figure 10:
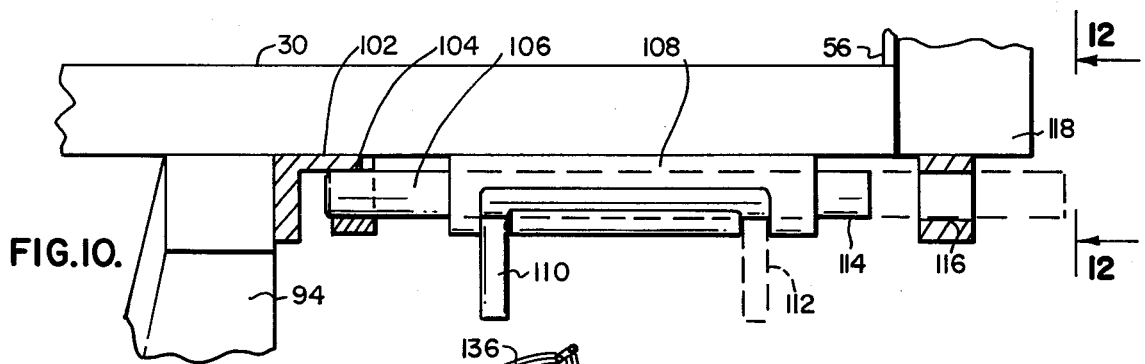
FIG. 10 is an enlarged fragmentary sectional view taken from line 10—10 of FIG. 3 showing latch mechanism adapted for connecting the compactor side of the container of the invention with a compactor actuator on the chasis of the related vehicle.

Upper arm portions 94 and 96 of the compactor actuator 74 are removeably connected to the compactor side 30 of the container 10 by means of latch mechanisms 98 and 100. These are shown in detail in FIG. 10 of the drawings, wherein the arm portion 94 of the compactor actuator 74 is shown carrying a socket member 102 which is fixed thereto; the socket member 102 having an opening 104 into which a latch bolt 106 is projected from a latch frame 108 in which the bolt 106 is slideably mounted. The latch bolt is provided with a handle 110 adapted to be either in the solid line position as shown in FIG. 10 or in a broken line position 112 in which case an opposite end 114 of the bolt 106 may be positioned in a socket member 116 fixed to the frame structure 118 of the container 10. Thus, the bolt, at its end 106, may be projected into the socket 102 or may be projected into the socket 116 whereby the compactor wall 30 of the container 10 may either be latched to the frame structure 118 of the container 10 or may be latched to the compactor actuator 74 by means of the arms 94 and 96, all as shown in FIGS. 3 and 10 of the drawings.

Figure 9:
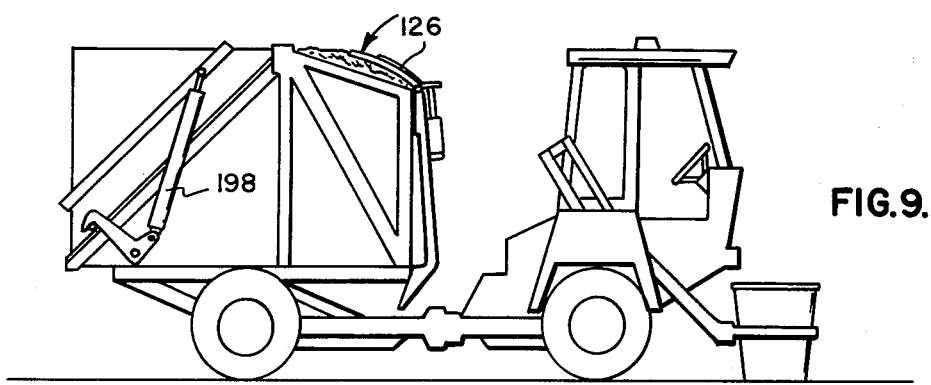
FIG. 9 is a view similar to FIG. 8 but showing a subsequent operation wherein a crusher mounted on the compactor actuator of the invention forces trash downwardly into the container after the compactor side of the container has been moved rearwardly to compress trash therein.
Figure 11:
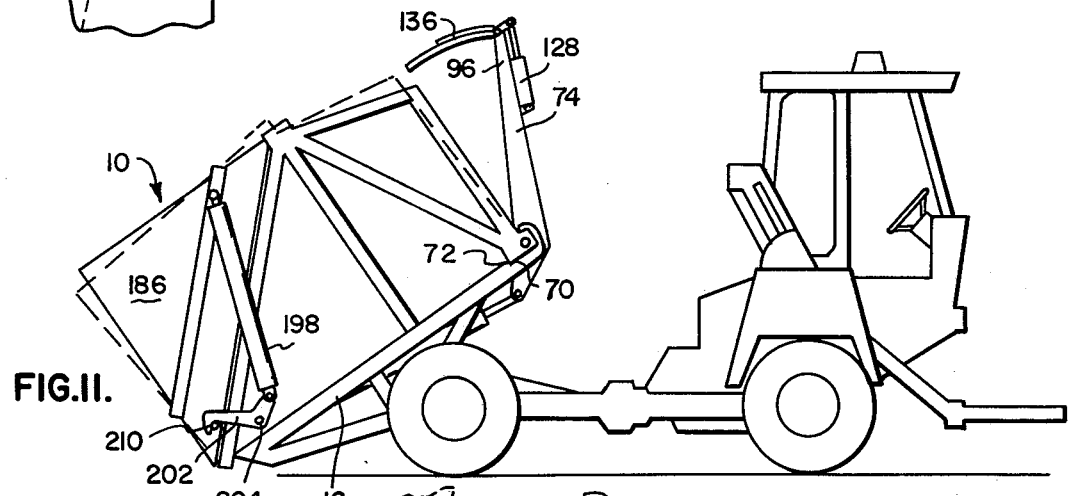
FIG. 11 is a side elevational view similar to FIGS. 7, 8 and 9 but showing a tiltable portion of the vehicle chasis tilting the container into a rearwardly declining position for unloading the container from the vehicle chasis.
Figure 12:
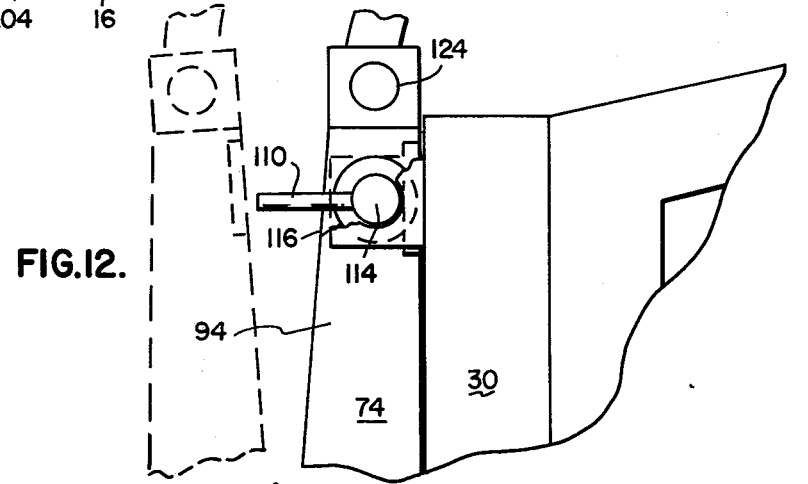
FIG. 12 is a fragmentary view taken from the line 12—12 of FIG. 10 showing disengagement of the compactor actuator relative to the pivoted compactor side of the container.

Pivotally mounted in bearings 120 and 122 is a shaft 124 which carries a crusher and compactor structure 126; the bearings 120 and 122 being mounted on the upper ends of the arms 96 and 94 respectively of the compactor actuator 74. The shaft 124 being pivoted in the bearings 120 and 122 and, as shown best in FIGS. 3 and 6, a hydraulic cylinder 128 is pivotally mounted by means of a pin 130 on the arm 94 and a plunger 132 of the cylinder 128 is pivotally connected by means of a pin 134 to an arm 136 which is fixed to the shaft 124 and adapted to pivot the crusher 126. This crusher 126 is a foraminous structure consisting of a plurality of strong curved fingers 140 fixed to the shaft 124 and a screen structure 141 extends part way from the shaft 124 longitudinally of the fingers 140 so as to provide a wind screen structure. It will be seen that the crusher or compactor structure 126 is pivotally operable from a generally vertical position, as shown in FIG. 2, to a rearwardly and downwardly directed position, such as shown in FIG. 9 or FIG. 11, so that upward and downward actuation of the crusher structure about the axis of the shaft 124 will cause trash to be compacted in the open area of the container 10 adjacent to the compactor wall 30 and between the quadrant portions 56 and 58, and it will be also understood that when the cylinder 82, as shown in FIG. 6, is energized that the compactor wall 30 will be moved rearwardly in a direction of an arrow 139 as shown best in FIG. 6 of the drawings.

Side screen structures 142 are disposed over opposite sides 52 and 54 of the container 10 and over upper edge portions 144 and 146 of the quadrant portions 56 and 58 respectively of the moveable wall structure of the container.

The wind screen structures 142 are each pivotally connected at 148 which is the axis of the shaft 124 about which the crusher 126 is pivotally moveable. It will be seen that opposite ends of the shaft 124 carry fixtures 150 and 152, each of which carries a forward portion 156 of a respective wind screen 142 and each wind screen 142 is provided with a rower 158 at its lower portion which traverses upper edges of the quadrants 56 and 58, namely the respective upper edges 144 and 146. These rowers 158 also trasverse upper edges 160 and 162 of the side portions 52 and 54 of the container 10.

Thus, the wind screens 142 move forwardly and backwardly toward the forward portion 14 of the container 10 or toward the rearward portion 12 of the container 10 as the compactor actuator 74 actuates the compactor side 30 of the container.

Figure 7:
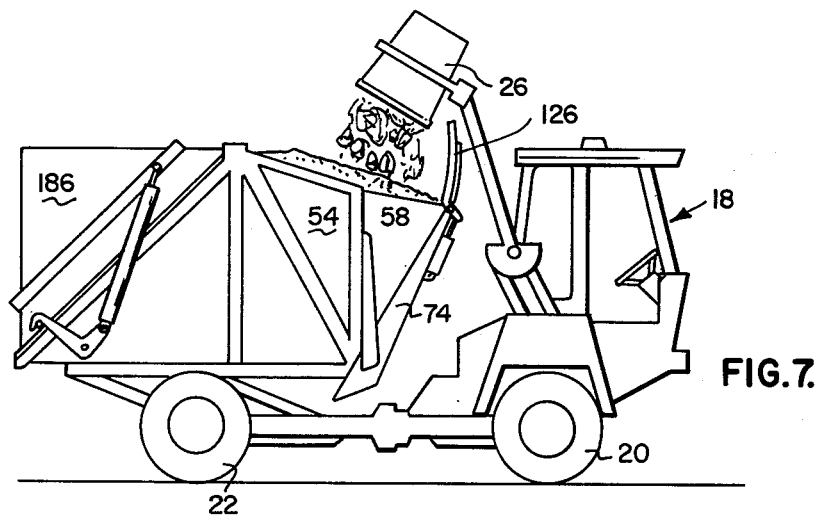
FIG. 7 is a side elevational view of the trash container and vehicle taken substantially as shown in FIG. 2 but on reduced scale and showing the front loader of the vehicle in position to dump trash into the forward portion of the trash collecting container when the compactor side thereof is pivoted into open position.
Figure 8:
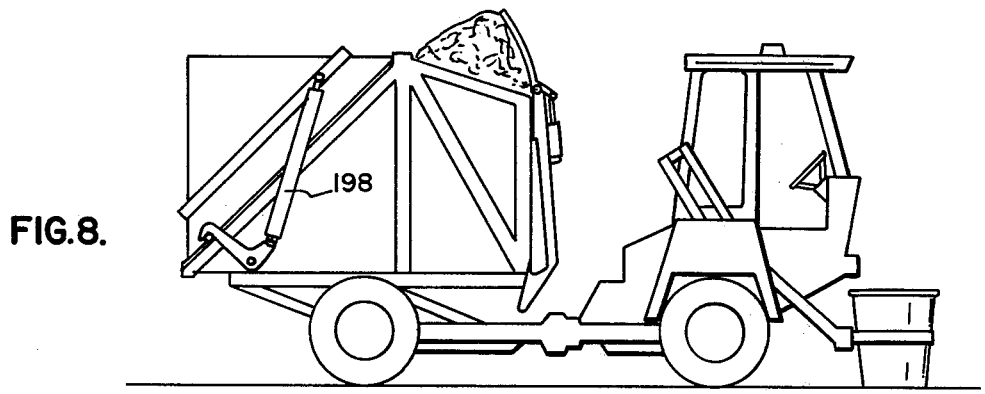
FIG. 8 is a view similar to FIG. 7 but showing the compactor side of the trash container moved rearwardly by the compactor actuator thereof to compress trash in the container.

The wind screens 142 and the wind screen portion 141 of the crusher 126 prevent trash from being blown away from the upper open area of the container when trash is being loaded thereinto, as best indicated in FIG. 7 of the drawings by means of the front loader mechanism 26 of the vehicle 18. This front loader mechanism 18 is adapted to grasp a conventional household trash receptacle or garbage can and to move it upwardly, backwardly and into and upsidedown position over the forward upper open area of the container 10 when the compactor wall 30 thereof is moved and pivoted to a forward position about the axis 32 as hereinbefore described.

In operation, the compactor structure hereinbefore described is partly retained by a removeable container which is readily removeably carried on the chasis of the vehicle 18 and the remaining portion of the compactor mechanism is carried and pivotally mounted directly on the chasis of the vehicle 18. Thus, the compactor wall 30, pivoted to the forward lower portion of the container 10, is readily and easily coupled to the compactor actuator 74 by the hereinbefore described latches 98 and compaction of trash in the container 10 is accomplished as hereinbefore described as the trash is dumped into the container by the front loader 26 with the compactor wall 30 in open position, as shown in FIGS. 2 and 6 of the drawings. When the trash builds up in the container, it is forced rearwardly by pivotal action of the compactor actuator 74 by operation of the hydraulic cylinder 82 which pivots the compactor actuator 74 and the compactor wall 30 rearwardly; and when the trash builds up to a level above the upper edges 144 and 146 of the quadrants 56 and 58, the crusher 126 is pivoted about the axis of the shaft 124 to thereby move the crusher 126 in the direction of an arrow 127 which forces the trash backwardly and downwardly between the screens 142 and this crusher 126 may be actuated initially before the compactor wall 30 is moved rearwardly and may again be operated after the compactor wall has reached its rear most position such as shown in FIG. 9 of the drawings.

When the container 10 is full and it is desired to remove it from the vehicle and pick up an empty container 10, the latch mechanisms 98 and 100 are released to a broken line position such as shown in FIG. 10 of the drawings, and the container 10 in loaded condition is then ready to be removed from the chasis of the vehicle 18.

This procedure is accomplished by means of the tiltable portion 16 of the truck chasis wherein the tiltable frame 16 carrying the container 10 is pivoted about the axis of a pin 164 carried by a bracket 166 mounted on the axle housing 168 of the vehicle chasis, all as shown best in FIG. 6 of the drawings. The tiltable frame portion 16 of the vehicle chasis is pivoted relative to the base frame 170 by means of a hydraulic cylinder 172 which is pivotally mounted on the base frame of the vehicle by means of a pin 174. The hydraulic cylinder 172 is provided with a plunger pivotally connected to a pin common to the axis of the pin 184 and fixed to the tiltable chasis portion 16.

Figure 13:
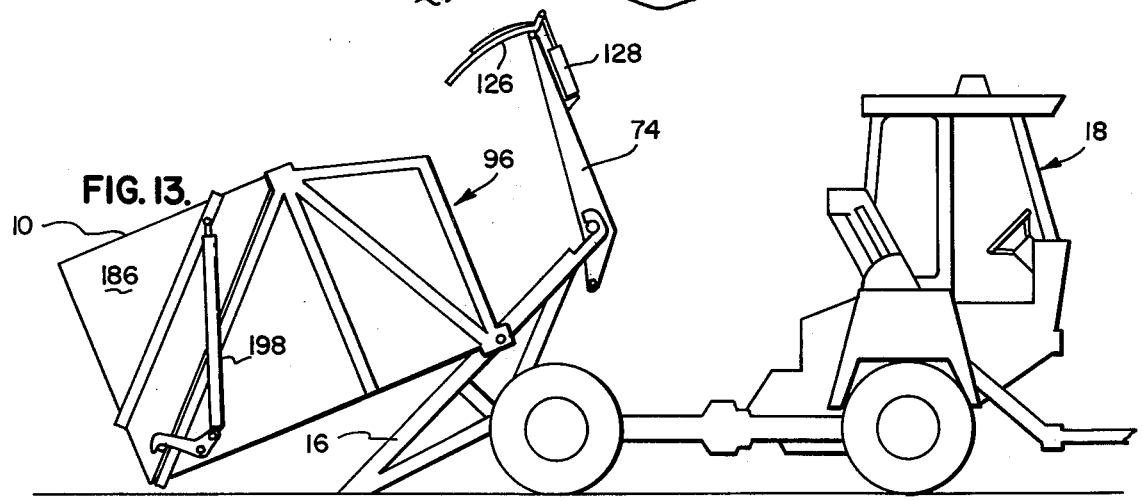
FIG. 13 shows a progression from FIG. 11 in which the container is being slideably removed downwardly onto the ground from a rearwardly declining portion of the vehicle chasis.

As the hydraulic cylinder 172 is energized, the frame 16 is pivoted upwardly and rearwardly into a rearwardly declining position, as shown in FIG. 11, and at this time a release mechanism, as shown in FIG. 4, is actuated by a manual handle 176 which is pivotally mounted on the shaft 76 hereinbefore described. This handle 176 pivots a lever 178 which lifts the ledge portion 70 at the forward lower portion of the container 10 upwardly out of interference with the ledge 72 as shown in FIG. 17. Thus, the container 10 is allowed to slide downwardly and backwardly from a position such as shown in FIG. 11 to the position shown in FIG. 13 at which time the vehicle 18 may be moved forward and thus leave the container 10 sitting on the ground.

Figure 14:
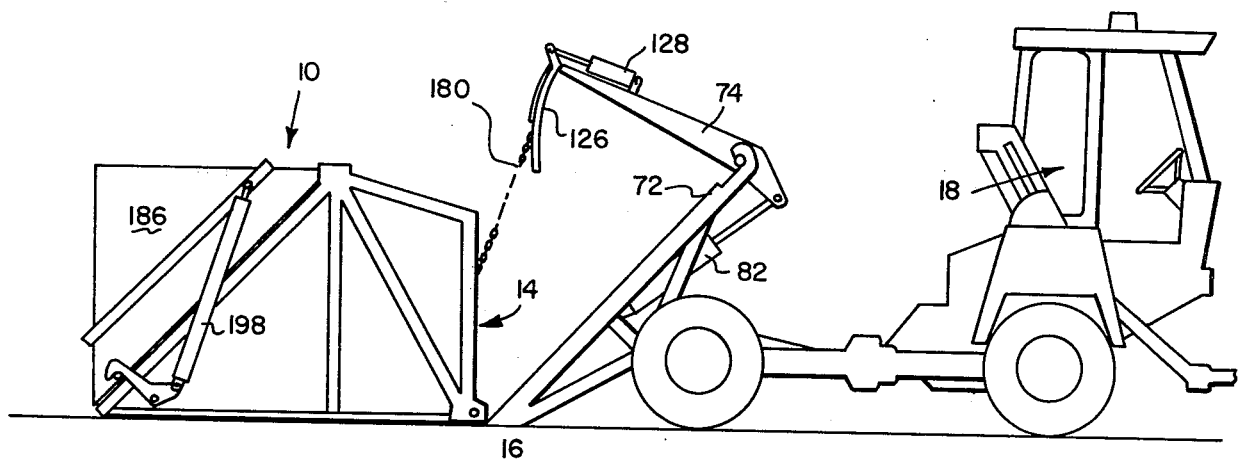
FIG. 14 is a side elevational view of a container of the invention and its related vehicle wherein a chain is coupled to the container while on the ground and the chain is also coupled to the compactor actuator such that the power operated compactor actuator may pull the container upwardly onto the inclined portion of the vehicle chasis.
Figure 15:
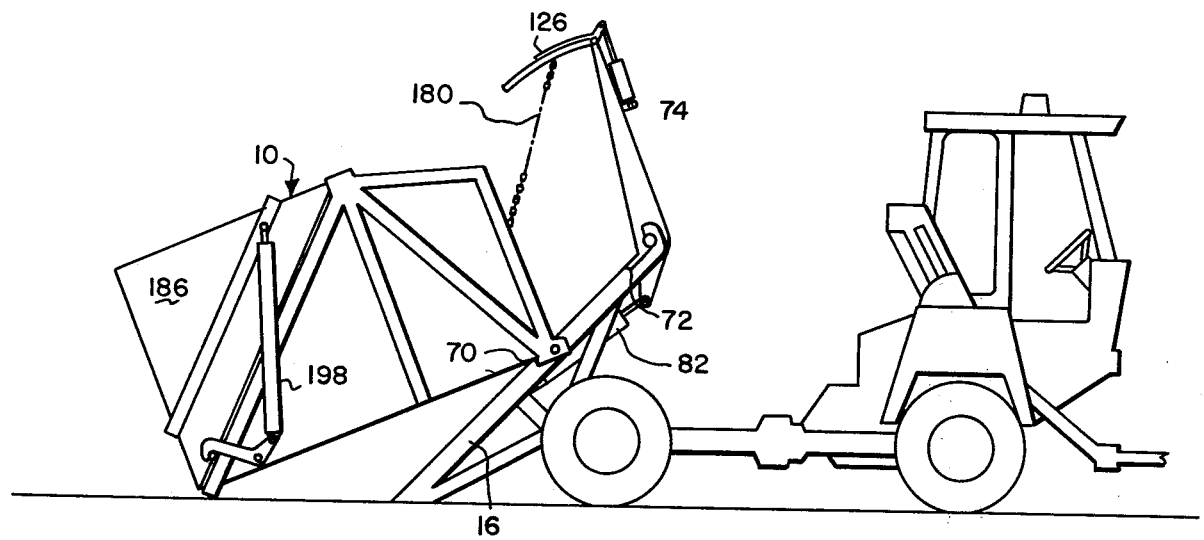
FIG. 15 is a view similar to FIG. 14 and showing a progression of the loading of the container onto the vehicle chasis from that as shown in FIG. 14.

When it is next desired to load another container 10 on the chasis frame portion 16, the vehicle 18 is backed into position adjacent the forward end 14 of the container 10 with the frame portion 16 in rearwardly declining position. A chain 180 is then attached to a chain holding fixture 182 on the front side of the compactor wall 30 of the container. The chain 180 is connected to another fixture 184 on the crusher 126. The fixtures 182 and 184 are shown in FIG. 3 of the drawings and are conventional bayonet chain receiving fixtures, such that the chain may be readily connected or disconnected relative thereto. The hydraulic cylinder 128, as shown in FIG. 14, is then energized whereby the crusher 126 is pivoted upwardly as shown in FIG. 15 creating tension on the chain 180 and pulling the container 10 upwardly on the pivoted frame portion 16, while at the same time the hydraulic cylinder 82 may be energized to retract its plunger and move the compactor actuator 74 forward. At this time, the cylinder 172 is also energized to bring the frame 16 forward into a horizontal position and slight continued forward movement of the compactor actuator 74 then moves the ledge 70 of the container 10 into a position in which it drops in front of the ledge 72. The hydraulic cylinder 82 may then be deenergized, allowing relaxation of the compactor actuator 72 relative to the chain 80 so that it may have some slack and be disconnected from the chain holding fixtures 182 and 184. The container 10 is then in the forward position as shown in FIG. 17 with the ledge of the container 10 directly in front of the ledge 72 of the chasis frame portion 16.

The foregoing mode of operation of filling the container 10 and compacting trash therein may be commenced as soon as the latch mechanisms 98 and 100 have been latched so as to secure the compactor actuator 74 to the moveable compactor wall 30 of the container 10.

The rearward portion of each of the containers 10 is provided with an openable bustle 186, as shown best in FIG. 6 of the drawings. This bustle is provided with an upper enclosed portion 188 and a rearward enclosed portion 190 and the upper portion 188 is pivoted by means of a pin 192 to the frame portion 194 of the container 10.

The frame 194 is disposed at a downward and rearward declining angle and extends from an area of the pin 192 to a lower rearward corner, as indicated by the reference character 196.

The bustle is capable of swinging to an open position, as indicated by broken lines in FIG. 6 of the drawings. This is accomplished by energization of a hydraulic cylinder 198 which is pivoted on a mounting pin 200 which is carried by a lever 202. The lever 202 is pivoted to the side of the container 10 by means of a pin 204 and a stop 206 limits movement of the lever 202 which is provided with a catch portion 208 engageable with a pin 210 on the side of the bustle 186.

It will be appreciated that a pair of these hydraulic cylinders 198 and related latch mechanisms may be on each opposite side of the bustle 186.

The catch 208 of the lever 202, when engaged with a pin 210, hold the bustle 186 closed, and when the hydraulic cylinder 198 is energized, the lever 202 is first pivoted against the stop 206 to pivot the catch 208 to the broken line position out of interference with the respective pin 10 and then the bustle 186 is pivoted upwardly into the broken line position, all as shown best in FIG. 6 of the drawings, which allows trash to be dumped from the container 10 when the chasis frame portion 16 is pivoted upwardly into a rearward declining position with the latch mechanisms 98 and 100 still holding the compactor wall to the compactor actuator 74 and with the ledge structures 70 and 72 still in engagement. Thus, the container 10 may be emptied and retained on the frame 16, all as indicated in FIG. 11 of the drawings, by broken lines.

It will be seen that the cylinder 198 is provided with an extendable plunger 199 pivoted to the bustle 186 by a suitable pivot pin 201 such as to move the bustle 186 to the broken line position shown in FIG. 11 when the hydraulic cylinder 198 is actuated as hereinbefore described.

Figure 28:
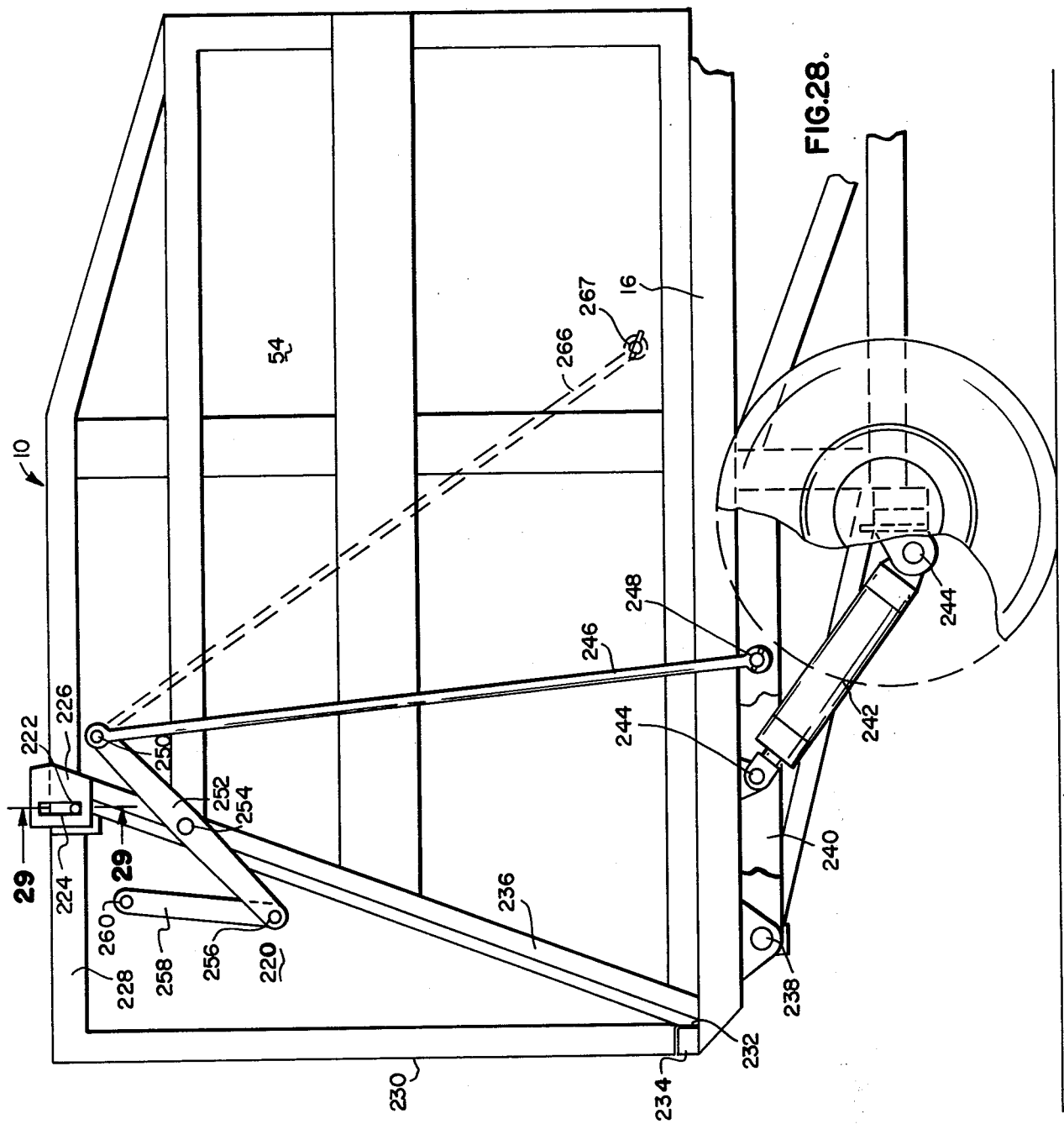
FIG. 28 is a side elevational view of a container as shown in FIG. 26 but showing the container in normal horizontal position on the vehicle chasis with the bustle thereof closed.
Figure 29:
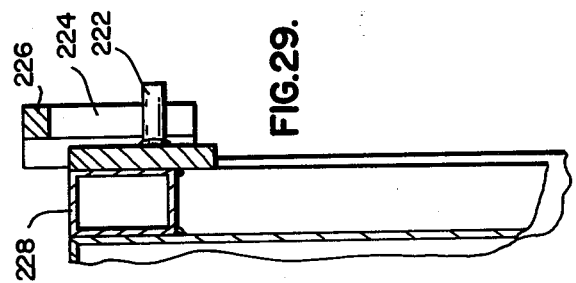
FIG. 29 is a fragmentary sectional view taken from the line 29—29 of FIG. 28.
Figure 30:
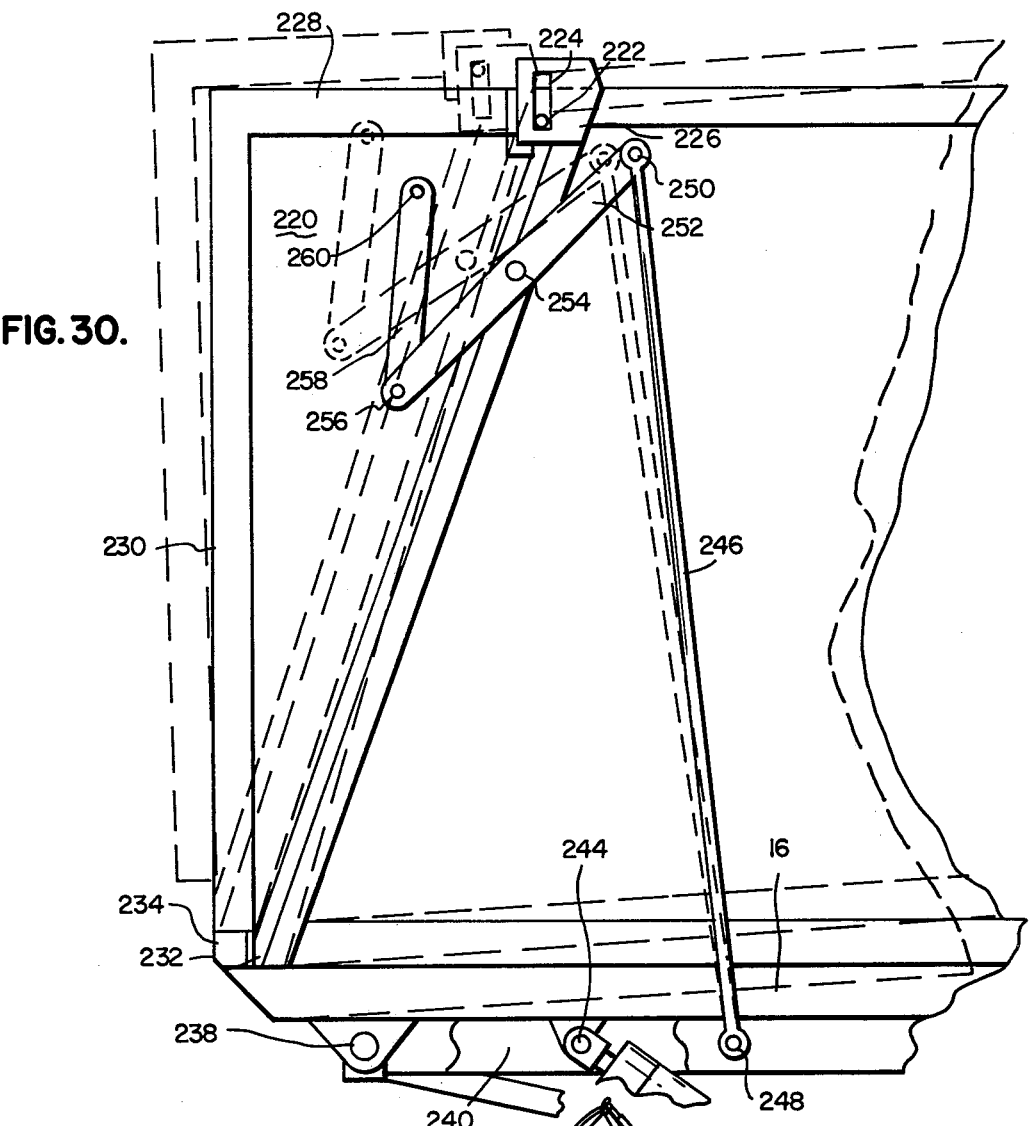
FIG. 30 is a fragmentary side elevational view of the bustle structure of the invention and a mechanical linkage for opening it and showing by solid and broken lines varying movements of the bustle for unlocking the rearward lower portion relative to a latch on the container preliminary to the movement of the bustle into position such as shown in FIG. 26.

A modified container bustle mechanism is shown in FIGS. 26, 28 and 30. This modified bustle mechanism is adapted to be used in lieu of the bustle 186 and its actuating mechanism. The modified bustle is designated 220 and is provided with pivot trunnions 222 on opposite sides thereof and at opposite sides 52 and 54 of the container 10.

The trunnions 222 are each vertically moveable in a vertical slot 224 of a respective bracket 226 fixed to each opposite side 52 and 54 of the container 10.

The bustle is provided with an upper enclosed side 228 and an enclosed rear 230. A lower edge portion 232 of the bustle is disposed forwardly of a rectangular bar 234 at the lower rearward portion of the container 10, and the lower edge 232 of the bustle 220 thus is locked in front of the bar 234 and adjacent to a frame portion 236 which is downwardly and rearwardly declined at the rearward portion of the container 10. The frame portion 16 of the vehicle is pivotally mounted by means of a pin 238 to a modified stationary frame structure 240 of the vehicle frame; a hydraulic cylinder 242 is pivoted on a pin 244 secured to the stationary frame of the vehicle and a plunger of the hydraulic cylinder 242 is pivotally mounted on a pin 244 which is carried by the pivoted portion of the frame 16 which pivots upwardly and rearwardly into rearward and downward declining position as shown in FIG. 26 of the drawings. A link 246 is pivotally connected by means of a pin 248 to the stationary portion 240 of the vehicle frame and an opposite end of the link 246 is pivoted on a pin 250 carried by a lever 252 which is pivoted at 254 on the frame portion 236 of the container 10. The opposite end of the lever 252 from the pin 250 is provided with another pivot pin 256 connected to a rigid link 258 which is stationarily pivoted by means of a stationary pin 260 to the side of the bustle 220.

The bustle 220 is moved to open position, as shown in FIG. 26, by progressive action, such as shown in FIG. 30, when the pivoted frame 16 is pivotally moveable upwardly relative to the stationary frame 240. Thus, the pin 248 remains in stationary position and holds the link 246 such that the lever 252 is pivoted on the pin 254 raising the link 258 and the bustle 220 with the trunnion sliding upward in the slots 224 until the edge portion 232 of the bustle, at its lower portion, clears the bar 234 and then, the further pivotal movement of the lever 252 and link 258 actuates the bustle pivotally about the trunnions 22 into the open position, as shown in FIG. 26 of the drawings. For displacement of the container 10 from the frame 16, as hereinbefore described, it is necessary to disconnect the link 246 by removing it from the pin 248, as shown in FIG. 27. The link 246 is provided with an eye 247 which fits over the pin 248 which is carried by the stationary frame 240. A cross pin or retainer pin 262 is removeably disposed in an opening 264 in the pin 248 and serves as a retainer for the eye 247 of the link 246. Thus, the pin 262 must be removed and the link 246 deflected outwardly over the end of the pin 248 and must be moved to a broken line position 266, as shown in FIG. 28, before the container 10 may be removed from the chasis 16.

It will be noted that a pin 267 similar to the pin 248 may be mounted on each opposite side 52 and 54 of the container 10 so as to provide means for holding the respective links 246. It will be understood that mechanism shown in FIG. 28 on the side 54 of the container 10 is duplicated on the opposite side 52 thereof so as to provide for uniform actuation and holding of the bustle 220 in either open or closed position.

In the closed position, the lower edge 232 of the bustle 220 is securely held in front of the bar 234 and thus held closed in a positive mechanical manner without any stress on the linkage or latch mechanism for the bustle 220.

Figure 31:
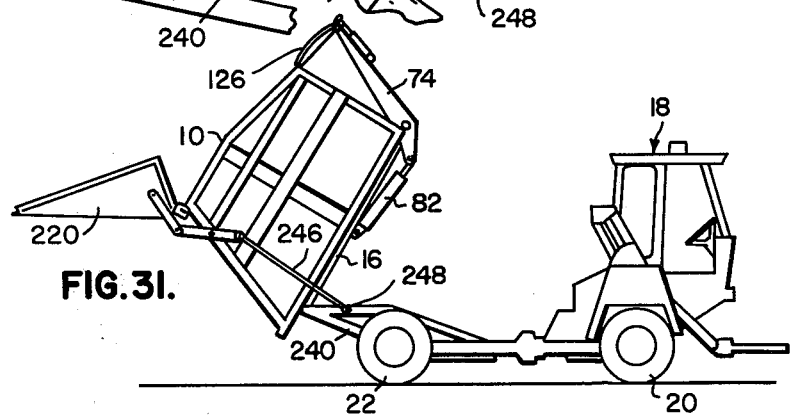
FIG. 31 is a view similar to FIG. 26 but showing the entire vehicle with the container in dumping position with the bustle opened by the mechanical linkage in connection therewith.

As shown in FIG. 31, the bustle 220 is in open position and the tiltable frame portion is tilted into a position which is downwardly and rearwardly declining so that trash may be emptied from the trash container 10 and so that the container 10 may again be filled. Thus, the vehicle 18 may be used to transport trash to a dump area and may be capable of dumping the contents of the container 10 and refilling the same container 10 without changing containers.

Figure 23:
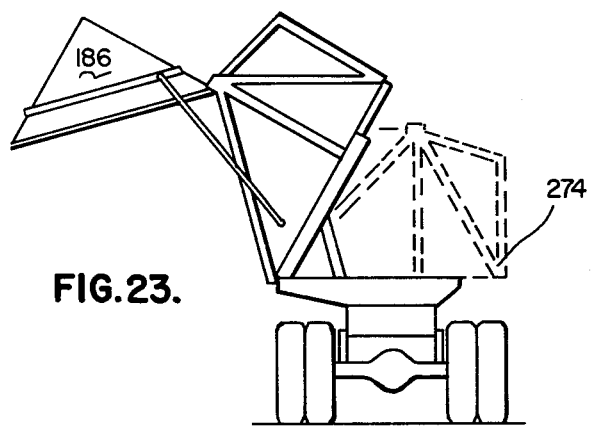
FIG. 23 is a rear view of a large vehicle having a tiltable chasis portion tiltable to the side of the truck and dumping trash from a trash container of the invention through the bustle thereof.

The foregoing mode of operation may be desirable in some areas, whereas in FIG. 23 the vehicle 18 is shown unloading the container 10 onto an inclined rack 270.

Figure 20:
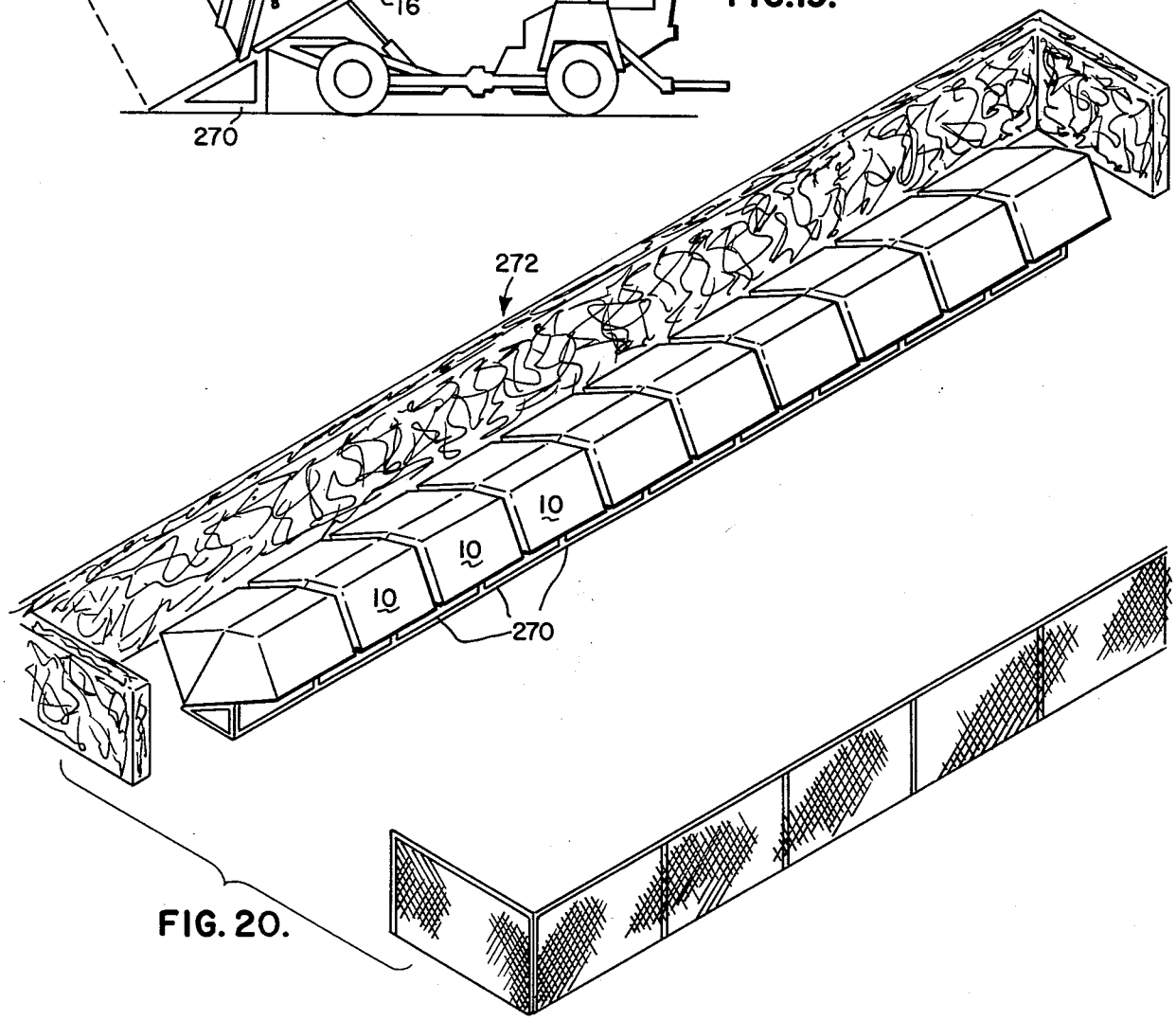
FIG. 20 is a fragmentary perspective view of storage rack facilities showing a plurality of the trash containers of the invention stored thereon.

The racks 270 may receive the containers 10 when they are full and when they are released from the tiltable frame 16 and the compactor actuator 74, as hereinbefore described. When the containers 10 are loaded and stored on the racks 270, a plurality of the containers 10 may be located on the racks 270, as shown in FIG. 20 of the drawings, and may be contained in a common storage area 272 so as to be picked up by a secondary transport vehicle as will be hereinafter described.

Figure 18:
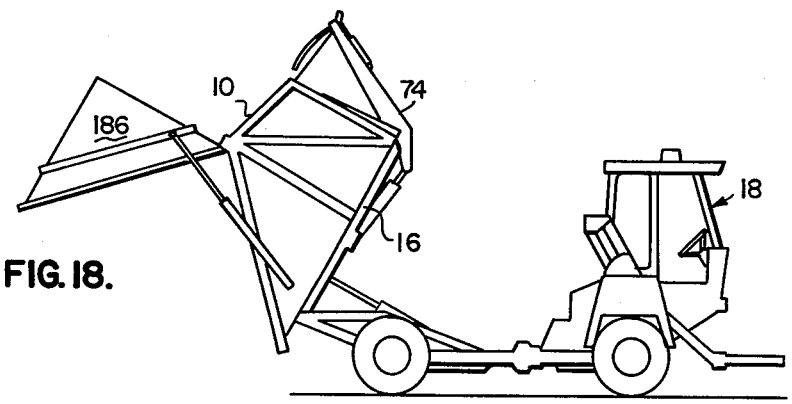
FIG. 18 is a side elevational view of the container and the vehicle wherein the container is pivoted into a rearwardly declining position and a bustle of the container is opened for dumping the trash from the interior of the container.

FIG. 18 discloses the container 10 with the bustle 186 as hereinbefore described in open position with the vehicle dumping the container 10 so that the container 10 may be filled and dumped alternately. Whereas, FIG. 19 discloses the unloading of the respective container 10 onto one of the racks 270 such as hereinbefore described in connection with FIG. 32 of the drawings. Accordingly, it will be obvious to those skilled in the art that the container 10 may be retained on the vehicle 18 and loaded and dumped, or several successive containers may be attached to the frame 16 of the vehicle and to the respective compactor actuator 74 as hereinbefore described, and may be detached so that the containers may be filled and stored on racks 270 or the containers may be dumped and refilled as desired.

Figure 19:
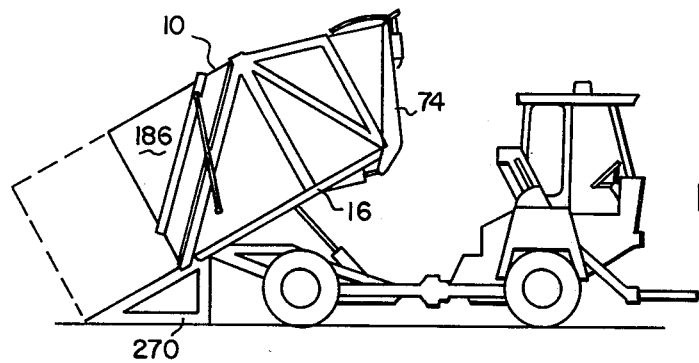
Figure 32:
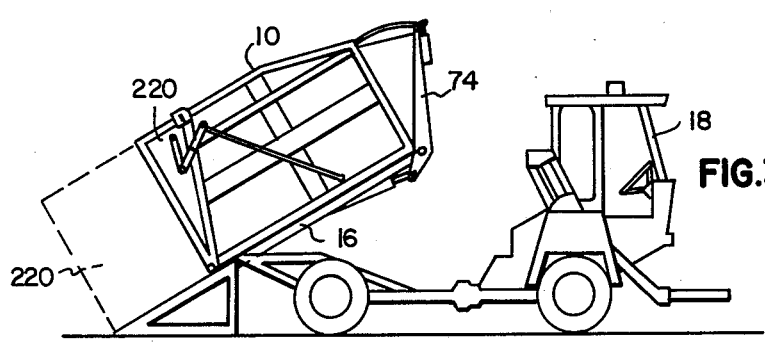
FIG. 32 is a view similar to FIG. 19 but showing the mechanical linkage for the bustle disconnected and showing the vehicle with its bed tilted into a rearwardly declining position for unloading the container from the vehicle chasis after the bustle linkage has been disconnected.

Thus, the trash container 10 is a very versatile mechanism capable of being used in both ways, as hereinbefore described in connection with the disclosure of FIGS. 18 and 19 and also FIGS. 31 and 32.

Figure 21:
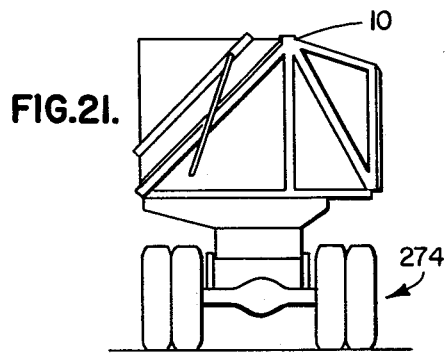
FIG. 21 is a rear end view of a large truck capable of carrying several of the trash containers of the invention thereon and showing such containers carried on the chasis of the large truck.
Figure 22:
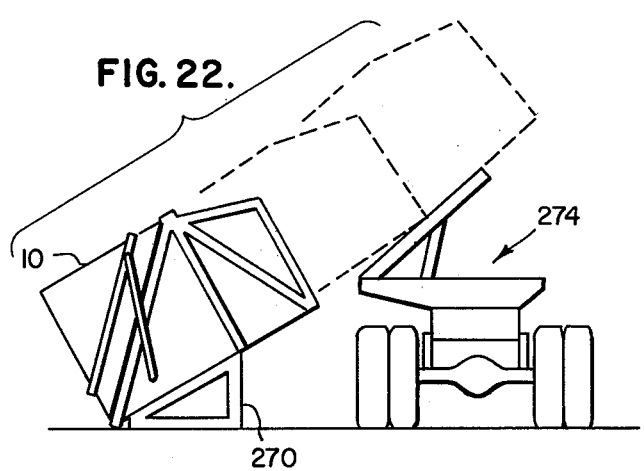
FIG. 22 is a view showing the chasis of the large truck redepositing containers of the invention on storage racks after having been dumped.
Figure 24:
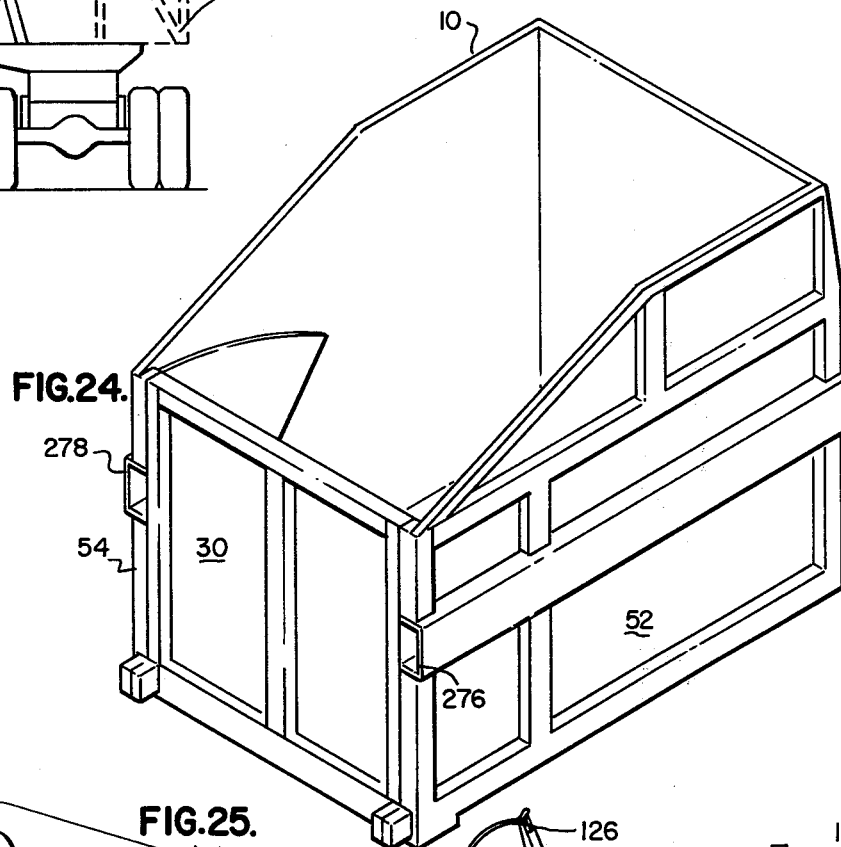
FIG. 24 is a perspective view of the trash container of the invention showing pick up means on opposite sides thereof adapted to be engaged by forks of a front loader of a large trash collection truck and showing the trash collection vehicle of the invention relative thereto.
Figure 25:
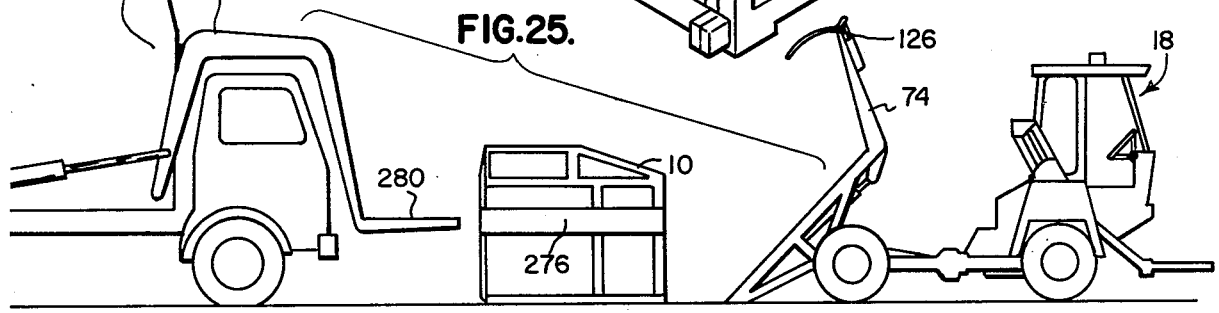
FIG. 25 is a side elevational view of the modified container of the invention as shown in FIG. 24 and showing a large forklift front loader trash collection vehicle relative thereto and also showing the trash collection of the invention relative thereto.

As disclosed in FIG. 21, a large transport truck 274 is capable of handling several of the containers 10 in loaded condition so as to transport them to a dump and to actuate the bustles for dumping them at one side of the truck chasis, and the large transport truck chasis 274 may load or unload several of the containers 10 relative to the racks 270 as shown in FIG. 22. Additionally, as shown in FIG. 24, opposite sides 52 and 54 of the container 10 are provided with pickup channels 276 and 278 adapted to be engaged by forks 280 of a large front loader mechanism 282 of a large transport truck 284 which is capable of handling the contents of a plurality of the containers 10. Thus, the channels 276 and 278, in FIGS. 24 and 25, provide and capability of the containers 10 to be handled by the front loader forks 280 of the front loader 282 in connection with the large trash transport vehicle 284. Thus, the vehicle 18, shown in FIG. 25, may carry the loaded container 10 to the site at which the large vehicle 284 may pick up the container.

The container 10 is first unloaded from the vehicle 18 as hereinbefore described and the large vehicle 284 may, by means of its front loader 280, unload the contents of the container 10 and place it back on the ground such that it will be available for refilling by operation of the vehicle 10 and the compactor actuator 74 and the crusher 126, all as hereinbefore described.

Reference is made to the front loader mechanism 26, hereinbefore referred to, and this front loader mechanism 26 is disclosed in detail in applicant's patent application Ser. No. 710,621, Filed 8/2/76, now abandoned and this disclosure of said copending application is hereby referred to for the details of the front loader mechanism 26 of the present application.

It will be obvious to those skilled in the art that various modifications may be resorted to without departing from the spirit of the invention.

I claim:

1. A vehicle chasis; a box like trash container removeably carried thereon; said container having a compactor side; first pivotal axis means; said compactor side being pivoted to said container by said first pivotal axis means; second pivotal axis means; a compactor actuator pivotally mounted on said chasis by said second pivotal axis means; means to selectively couple said compactor actuator to said compactor side of said container; and means on said chasis disposed to temporarily hold said container in such position thereon so as to temporarily maintain said first and second pivotal axis means aligned on a common pivotal axis, means on said chassis and said compactor actuator for transferring said container relative to said chassis, and means for actuating said compactor actuator.

2. The invention as defined in claim 1, wherein: said vehicle chasis has a forward portion and a rearward portion; said compactor side of said container being disposed toward said forward portion of said vehicle; said trash container having a rearward portion; an openable and closeable bustle pivotally mounted on said container and adapted to open and close said rearward portion of said container.

3. The invention as defined in claim 1, wherein: said vehicle chasis has a forward portion; said compactor side of said container directed toward said forward portion; said first pivotal axis means being at a forward and lower portion of said container such that the upper portion of said compactor side is pivotally moveable forward toward the forward side of said vehicle; and means on the forward portion of said vehicle disposed and adapted to grasp containers and move them upwardly, backwardly and into an upsidedown position over said forward portion of said container when upper portion of said compactor side is pivoted into a forward position.

4. The invention as defined in claim 3, wherein: said chasis includes an articulated steering mechanism comprising front wheels and rear wheels and vertical axis pivot means disposed in an intermediate position between said front wheels and said rear wheels; said vertical axis pivot means being substantially aligned with a forward portion of said container on said vehicle chasis.

5. The invention as defined in claim 1, wherein: said container includes an upper portion, a lower portion, a forward portion and a rearward portion; said first pivotal axis means being at the forward lower portion of said container and said compactor side having an upper portion pivotally moveable about said first pivotal axis means to a position in a forward direction beyond the normal forward confines of said container; said container having a downwardly projecting portion which is disposed at said lower portion; and a generally recessed ledge structure on said chasis adapted to abut and retain said downwardly projecting portion of said container such as to maintain said first and second pivotal axis means in axial alignment with each other.

6. The invention as defined in claim 2, wherein: said container includes an upper portion, a lower portion, a forward portion and a rearward portion and wherein said bustle is pivotally coupled to said upper portion of said container at a location between said forward and rearward portions and said bustle is provided with an openable portion which is disposed near said lower and rearward portions of said container; said container having opposite sides; said bustle forming portions of the upper, rearward and opposite side portions of said container; said bustle having means for latching it in closed position relative to said container; a tiltable bed on said chasis on which said container is carried.

7. The invention as defined in claim 5, including lever means for lifting the forward portion of said container upward so as to release said downwardly projecting portion from said ledge of said chasis and to thereby allow said container to be removed from said chasis.

8. The invention as defined in claim 5, wherein: said container includes opposite sides; and guide means disposed to provide for lateral location of opposite sides of said container relative to said chasis.

9. The invention as defined in claim 1, wherein: said chasis includes a tiltable frame portion adapted to be tilted upwardly and backwardly into a rearwardly declining disposition for slideably unloading said container from said chasis.

10. The invention as defined in claim 9, including flexible means adapted to couple said compactor actuator to said container for pulling said container upwardly onto said rearwardly declining portion of said frame when loading said container thereonto.

11. The invention as defined in claim 1, wherein: said compactor side of said container comprises a pair of quadrant portions which pivot into and out of said container and extend in overlapping relation with opposite sides of said container when said compactor side of said container is in open position.

12. The invention as defined in claim 1, wherein: said compactor side of said container includes an upper edge portion and a lower portion; said first pivotal axis means being located generally at said lower portion; a trash crusher means pivotally mounted on said upper edge; power operated means for actuating said trash crusher means in a generally rearward and downward direction toward said container when said compactor side of said container is in forward open position.

13. The invention as defined in claim 1, wherein: said compactor side of said container having an upper edge portion; quadrant portions coupled to said compactor side and extendable into and out of opposite sides of said container and in overlapping relationship therewith; and wind screen means at opposite sides of said container near said compactor side; and a pivoted trash crusher means pivotally mounted on said upper edge of said compactor side of said container and means for power operation thereof in a downward and backward direction toward said container.

14. The invention as defined in claim 13, wherein: said trash crusher and compactor means is a foraminous structure adapted to compress trash downwardly into said container when said compactor side is pivoted in open position relative thereto.

15. The invention as defined in claim 1, wherein: said chasis includes a frame structure which is tiltable on a generally horizontal axis and into a rearwardly declining position; a plurality of stationary racks respectively adapted to receive several of said containers from said tiltable frame portion of said chasis whereby said chasis may unload a container on one of said racks by simply tilting the frame portion of said chasis to a rearwardly declining disposition so as to slide the respective container off said chasis and onto a respective inclined rack which generally coincides with the declining disposition of said frame portion of said chasis.

16. The invention as defined in claim 2, including a bustle actuating means disposed to open and close said bustle; said chasis having a tiltable portion carrying said container; said frame having a stationary portion; and means coupling said bustle actuating means with said stationary portion of said frame, whereby when said tiltable portion of said chasis is tilted relative to said stationary portion of said frame, said bustle is opened relative to said rearward portion of said container.

17. The invention as defined in claim 16, wherein: said bustle includes a lower edge portion; said container having an upwardly extending bar; said lower edge portion being disposed in front of said bar and abutted thereto; said bustle actuating means having a mechanism adapted to raise said bustle until said lower edge clears said bar; and means for pivotally actuating said bustle into an open position relative to the rearward portion of said container.

* * * * *